US012198866B2

(12) United States Patent
Kakuma

(10) Patent No.: US 12,198,866 B2
(45) Date of Patent: Jan. 14, 2025

(54) SOLID ELECTROLYTIC CAPACITOR WITH WATER-SOLUBLE FIRST POLYMER AND WATER-DISPERSIBLE SECOND POLYMER, AND MANUFACTURING METHOD THEREOF

(71) Applicant: SUN Electronic Industries Corp., Shijonawate (JP)

(72) Inventor: Kenji Kakuma, Shijonawate (JP)

(73) Assignee: SUN Electronic Industries Corp., Shijonawate (JP)

( * ) Notice: Subject to any disclaimer, the term of this patent is extended or adjusted under 35 U.S.C. 154(b) by 0 days.

(21) Appl. No.: 18/685,528

(22) PCT Filed: Aug. 23, 2022

(86) PCT No.: PCT/JP2022/031676
§ 371 (c)(1),
(2) Date: Feb. 22, 2024

(87) PCT Pub. No.: WO2023/027058
PCT Pub. Date: Mar. 2, 2023

(65) Prior Publication Data
US 2024/0266120 A1 Aug. 8, 2024

(30) Foreign Application Priority Data
Aug. 27, 2021 (JP) ................ 2021-138696

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/10* (2013.01); *H01G 9/145* (2013.01); *H01G 9/15* (2013.01)

(58) Field of Classification Search
CPC ........ H01G 9/145; H01G 9/0036; H01G 9/15; H01G 9/10; H01G 9/028
See application file for complete search history.

(56) References Cited

U.S. PATENT DOCUMENTS

2008/0002334 A1    1/2008   Kakuma et al.
2014/0328007 A1*  11/2014   Endo ............... H01G 9/0036
                                                   29/25.03
(Continued)

FOREIGN PATENT DOCUMENTS

JP    2008-010657 A    1/2008
JP    2019-201109 A   11/2019
(Continued)

OTHER PUBLICATIONS

International Search Report (with partial translation) dated Nov. 15, 2022, issued in corresponding International Patent Application No. PCT/JP2022/031676.
(Continued)

*Primary Examiner* — David M Sinclair
(74) *Attorney, Agent, or Firm* — Morgan, Lewis & Bockius LLP

(57) ABSTRACT

A capacitor element has a water-soluble first polymer disposed on the surfaces of anode and cathode members and a water-dispersible second polymer disposed on the surfaces of the anode and cathode members on which the first polymer is disposed. The second polymer electrically connects together the anode and cathode members. Between the surfaces of the anode and cathode members and between the inner face of a case and the outer face of the capacitor element, a solid-at-normal-temperature substance is disposed that has an electrolyte dissolved in a solvent that is
(Continued)

solid at or below a first temperature and that melts when heated to or above a second temperature higher than the first temperature.

13 Claims, 18 Drawing Sheets

(51) Int. Cl.
*H01G 9/10* (2006.01)
*H01G 9/145* (2006.01)
*H01G 9/15* (2006.01)

(56) References Cited

U.S. PATENT DOCUMENTS

| | | | |
|---|---|---|---|
| 2016/0099113 A1* | 4/2016 | Komatsu | H01G 9/022 29/17.3 |
| 2022/0013808 A1* | 1/2022 | Chaves Noguera | H01M 50/4295 |
| 2022/0328255 A1 | 10/2022 | Takezawa et al. | |
| 2022/0351913 A1* | 11/2022 | Saito | H01G 9/15 |
| 2022/0367123 A1 | 11/2022 | Takezawa et al. | |
| 2023/0335342 A1 | 10/2023 | Sato et al. | |

FOREIGN PATENT DOCUMENTS

| | | |
|---|---|---|
| WO | 2021/049015 A1 | 3/2021 |
| WO | 2021/049190 A1 | 3/2021 |
| WO | 2021/149739 A1 | 7/2021 |
| WO | 2021/149751 A1 | 7/2021 |

OTHER PUBLICATIONS

Written Opinion (with partial translation) dated Nov. 15, 2022, issued in corresponding International Patent Application No. PCT/JP2022/031676.

Office Action dated Sep. 21, 2024, issued in corresponding Chinese Patent Application No. 202280058421.2.

* cited by examiner

DRYING STEP

MELTING STEP

COOLING

SOLIDIFYING STEP

PULVERISING STEP

RE-MELTING

INSERTING STEP

RE-SOLIDIFYING STEP

SEALING STEP

AGING STEP

SOLID ELECTROLYTIC CAPACITOR WITH WATER-SOLUBLE FIRST POLYMER AND WATER-DISPERSIBLE SECOND POLYMER, AND MANUFACTURING METHOD THEREOF

TECHNICAL FIELD

The present invention relates to solid electrolytic capacitors and to methods of manufacturing solid electrolytic capacitors.

BACKGROUND ART

Known capacitors have, for example, a case with an opening for insertion of a capacitor element, the capacitor element housed in the case, and a sealing member fitted to the opening. The capacitor element has a structure in which an anode and a cathode, each in an elongate shape, that are disposed to face each other with a separator in between are wound up.

Of the opposing surfaces of the anode and the cathode, at least the opposing surface of the anode is an oxide film. Moreover, between the anode and cathode, a water-dispersible electrically conductive polymer is disposed. Furthermore, generally, between the anode and the cathode, an electrolytic solution is provided (see Patent Document 1).

CITATION LIST

Patent Literature

Patent Document 1: JP-A-2008-010657

SUMMARY OF INVENTION

Technical Problem

Known capacitors have the drawback: in their use environment, the capacitor element is exposed to heat, vibration, and the like and, as they are used for a long period, the electrolytic solution evaporates through the sealing member, resulting in deterioration in capacitor characteristics.

An object of the present invention is to provide a solid electrolytic capacitor that keeps stable capacitor characteristics for a long period, and to provide a method of manufacturing such a solid electrolytic capacitor.

Solution to Problem

To achieve the above object, according to one aspect of the present invention, a solid electrolytic capacitor includes: a case in the shape of a bottomed tube with an opening: a capacitor element that has an anode member and a cathode member wound up with a separator in between and that is housed in the case; and a sealing member that seals the opening. The capacitor element has: a water-soluble first polymer disposed between the surface of the anode member and the surface of the cathode member; and a water-dispersible second polymer disposed on the surface of the anode member on which the first polymer is disposed and on the surface of the cathode member on which the first polymer is disposed. The second polymer electrically connects together the surface of the anode member and the surface of the cathode member. Between the surface of the anode member and the surface of the cathode member in the capacitor element and between the inner face of the case and the outer face of the capacitor element, a solid-at-normal-temperature substance is disposed that has an electrolyte dissolved in a solvent that is solid at or below a first temperature and that melts when heated to or above a second temperature higher than the first temperature.

According to another aspect of the present invention, in the solid electrolytic capacitor structured as described above, the first polymer may be disposed on the surface of the anode member, on the surface of the cathode member, and on a surface of the separator According to another aspect of the present invention, in the solid electrolytic capacitor structured as described above, the first temperature may 30° C.

According to another aspect of the present invention, in the solid electrolytic capacitor structured as described above, the solvent may contain at least one of polyethylene glycol, a polyhydric alcohol, an aliphatic acid ester of glycerol, and a sugar.

According to another aspect of the present invention, in the solid electrolytic capacitor structured as described above, the second temperature of the solvent may be 50° C.

According to another aspect of the present invention, in the solid electrolytic capacitor structured as described above, the solvent may contain at least one of PEG2000, PEG4000, PEG6000, PEG10000, PEG20000, 1,2-dodecane diol, 1,12-dodecane diol, polyglyceryl-6 stearate, polyglyceryl-6 tristearate, polyglyceryl-4 pentastearate, polyglyceryl-10 decastearate, polyglyceryl-10 hepta(behenate/stearate), xylitol, and sorbitol.

According to another aspect of the present invention, in the solid electrolytic capacitor structured as described above, the electrolyte may contain either an acid selected from the group of maronic acid, succinic acid, glutaric acid, adipic acid, sebacic acid, decane-dicarboxylic acid, tartronic acid, fumaric acid, maleic acid, citraconic acid, malic acid, tartaric acid, phthalic acid, nitrophthalic acid, citric acid, tricarbanilic acid, pyromellitic acid, boric acid, phosphoric acid, borodisalicylic acid, borodiglycolic acid, trinitrophenol, hydroxynitrophenol, hydroxynitrobenzoic acid, and sulfosalicylic acid or a base selected from the group of ammonia, monoethylamine, diethylamine, triethylamine, trimethylamine, N,N-dimethylethylamine, N,N-diethylmethylamine, monoethanolamine, diethanolamine, triethanolamine, benzylamine, naphthylamine, morpholine, aniline, acetanilide, phenanthroline, caffeine, and imidazole.

According to another aspect of the present invention, in the solid electrolytic capacitor structured as described above, the sealing member may made of rubber or resin.

To achieve the above object, according to yet another aspect of the present invention, a method of manufacturing a solid electrolytic capacitor includes: a capacitor element fabricating step of fabricating the capacitor element by performing a step of immersing in a solution containing a water-soluble first polymer and a water-dispersible second polymer a capacitor structure formed by winding up an anode member and a cathode member with a separator in between and a step of taking the capacitor structure out of the solution and drying the capacitor structure; and an inserting step of inserting the capacitor element in the case that houses the solid-at-normal-temperature substance melted by being heated to or above the second temperature so that part of the melted solid-at-normal-temperature substance permeates an interior of the capacitor element.

Advantageous Effects of Invention

According to the present invention, it is possible to provide a solid electrolytic capacitor that keeps stable capacitor characteristics for a long period, and to provide a method of manufacturing such a solid electrolytic capacitor

DESCRIPTION OF EMBODIMENTS

Figure 1:
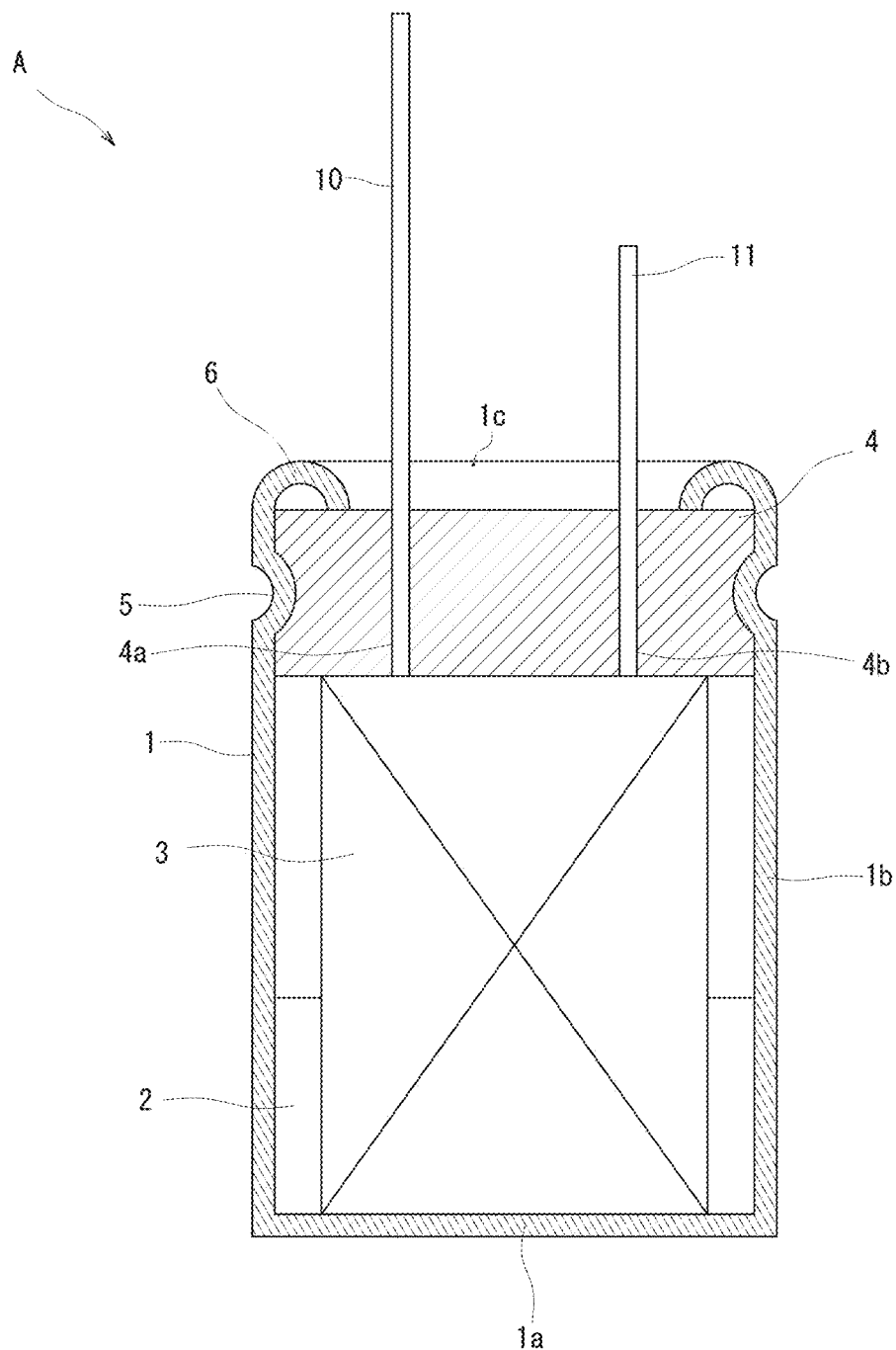
FIG. 1 is a side sectional view of a solid electrolytic capacitor according to one embodiment.
Figure 2:
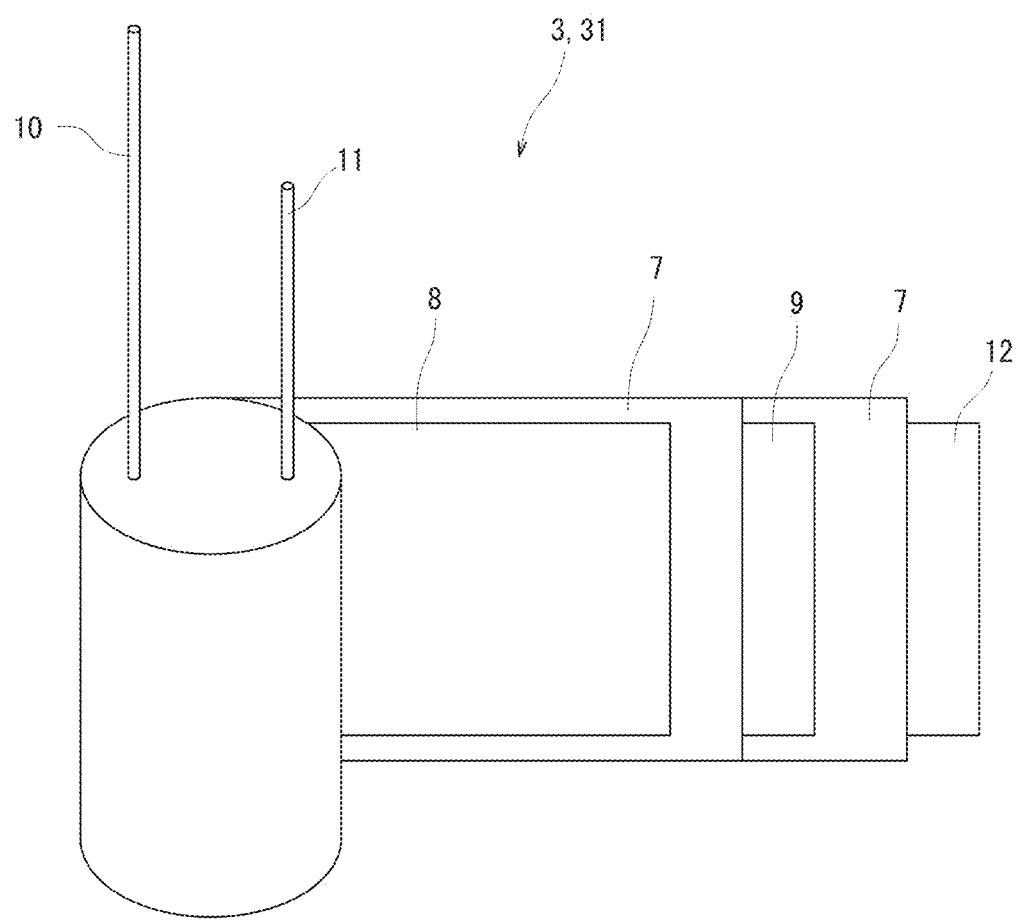
FIG. 2 is a perspective view showing a capacitor element, partly unwound, in the solid electrolytic capacitor shown in FIG. 1.

A solid electrolytic capacitor according to one embodiment of the present invention will be described below with reference to the drawings. FIG. 1 is a side sectional view of a solid electrolytic capacitor A according to one embodiment of the present invention. FIG. 2 is a perspective view of a capacitor element 3, partly unwound, in the solid electrolytic capacitor A shown in FIG. 1.

The solid electrolytic capacitor A includes a case 1, a capacitor element 3, and a sealing member 4. The case 1 is made of metal such as aluminum and has the shape of a bottomed tube with a circular cross-section. The case 1 has a bottom portion 1a and a tubular portion 1b. The bottom portion 1a has the shape of a disc. The tubular portion 1b connects to the radially outer edge of the bottom portion 1a and extends along the axial direction. Note that the side of the bottom portion 1a at which the tubular portion 1b is connected to it will be called the top (upper) side. The tubular portion 1b has an opening 1c at its top end. That is, the case 1 has one end of the tubular portion 1b closed with the bottom portion 1a and has the other end of the tubular portion 1b left open with the opening 1c.

The capacitor element 3 is housed in the case 1, and includes an anode member 8 used as the anode and a cathode member 9 used as the cathode (see FIG. 2). To the anode member 8 and the cathode member 9 are connected an anode lead terminal 10 and a cathode lead terminal 11 respectively. The capacitor element 3 has a cylindrical shape, and the anode lead terminal 10 and the cathode lead terminal 11 are led out of it from one end of it along the axial direction.

The sealing member 4 is formed of a molding of an electrically insulating elastic material such as rubber, in the shape of a disc. The sealing member 4 has a pair of through holes 4a and 4b. With the sealing member 4 put in the opening 1c of the case 1, the circumferential face of the case 1 is swaged to form a depressed portion 5. In this way, the sealing member 4 is fastened. Moreover, the open end of the case 1 is folded inward to form a contact portion 6.

The sealing member 4 is fastened in the opening 1c of the case 1 by the depressed portion 5 and the contact portion 6. That is, the opening 1c of the case 1 is sealed by the sealing member 4. The sealing member 4 has the through holes 4a and 4b formed so as to penetrate it along its thickness direction. When the capacitor element 3 is housed in the case 1, the anode lead terminal 10 and the cathode lead terminal 11 of the capacitor element 3 are put through the through holes 4a and 4b. In this way, the capacitor element 3 is fastened in the case 1.

As shown in FIG. 1, in the solid electrolytic capacitor A, between the anode member 8 and the cathode member 9 is disposed a solid-at-normal-temperature substance 2. More specifically, the solid-at-normal-temperature substance 2 is disposed between the surface of the anode member 8 and the surface of the cathode member 9, on the surface of a separator 7, and between the inner face of the case 1 and the outer face of the capacitor element 3.

Next, the capacitor element 3 will be described in detail. As shown in FIG. 2, the capacitor element 3 is formed by winding up an anode member 8 and a cathode member 9, each in an elongate shape, with a separator 7, which is an insulator, in between. In the capacitor element 3, a separator 7 is disposed at the outermost circumference, and the separator 7 fastened with tape 12. Note that, in the capacitor element 3 according to this embodiment, the anode member 8 serves as the anode and the cathode member 9 serves the cathode.

For example, the anode member 8 and the cathode member 9 are made of aluminum. On the surface of each of the anode member 8 and the cathode member 9, an oxide film (not illustrated) is disposed. The oxide film on the anode member 8 and the oxide film on the cathode member 9 are both produced by a process (chemical conversion treatment) in which an electrode member made of aluminum is anodized in an electrolytic solution, and the film thickness is proportional to the voltage applied. The oxide film on the anode member 8 is made thicker than the oxide film on the cathode member 9. An oxide film needs to be formed at least on the surface of the anode member 8: that is, no oxide film may be formed on the surface of the cathode member 9.

As mentioned above, the anode lead terminal 10 is connected electrically and mechanically to the anode member 8: the cathode lead terminal 11 is connected electrically and mechanically to the cathode member 9.

The solid-at-normal-temperature substance 2 is a substance that is solid at normal temperature. Here, normal temperature is assumed to be, for example, 30° C. More specifically, the solid-at-normal-temperature substance 2 contains: a solvent 21 that is solid at or below a first temperature (e.g., normal temperature, here 30° C.) and that melts when heated to a predetermined temperature (melting point) over a second temperature higher than the first temperature; and an electrolyte 22 dissolved in the solvent 21 (see FIG. 6). The solid-at-normal-temperature substance 2 will be described in detail later.

Figure 3:
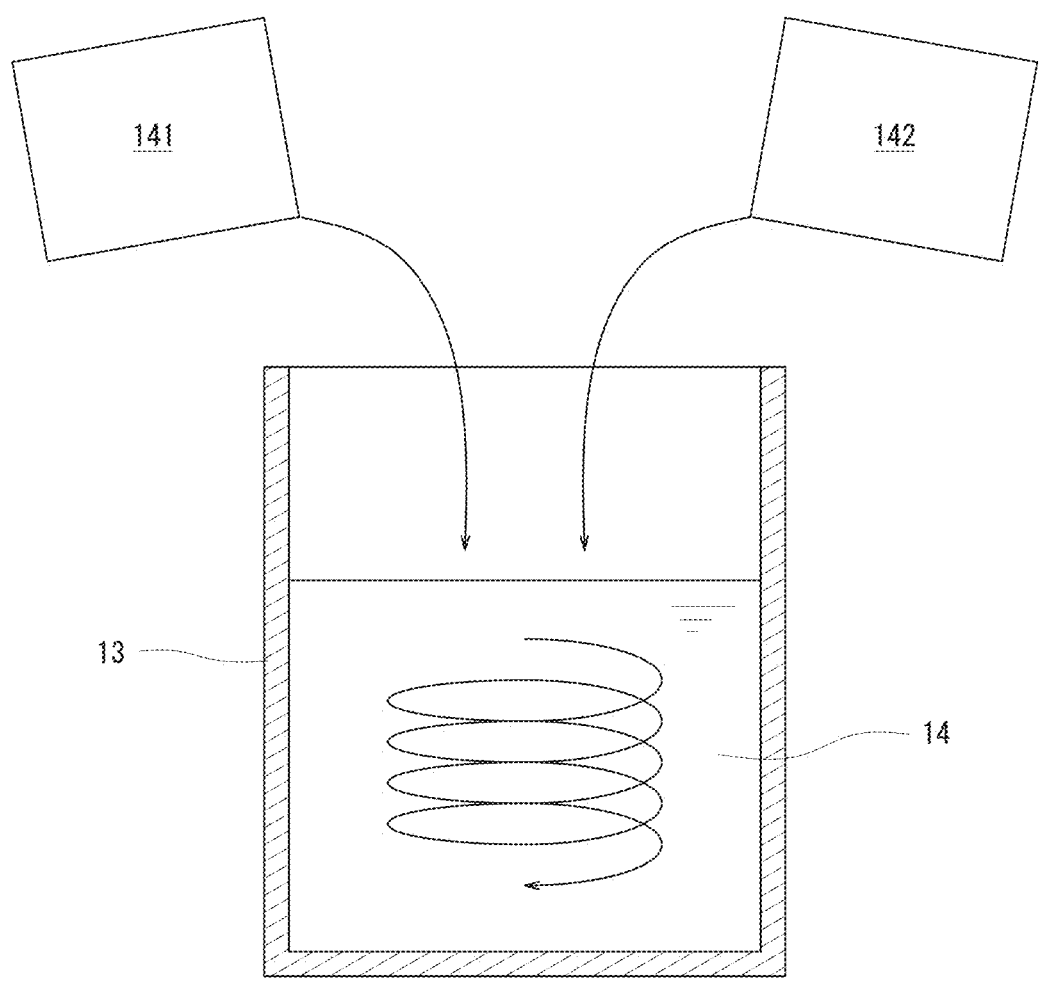
FIG. 3 is a schematic diagram showing a solution used in an immersing step.
Figure 4:
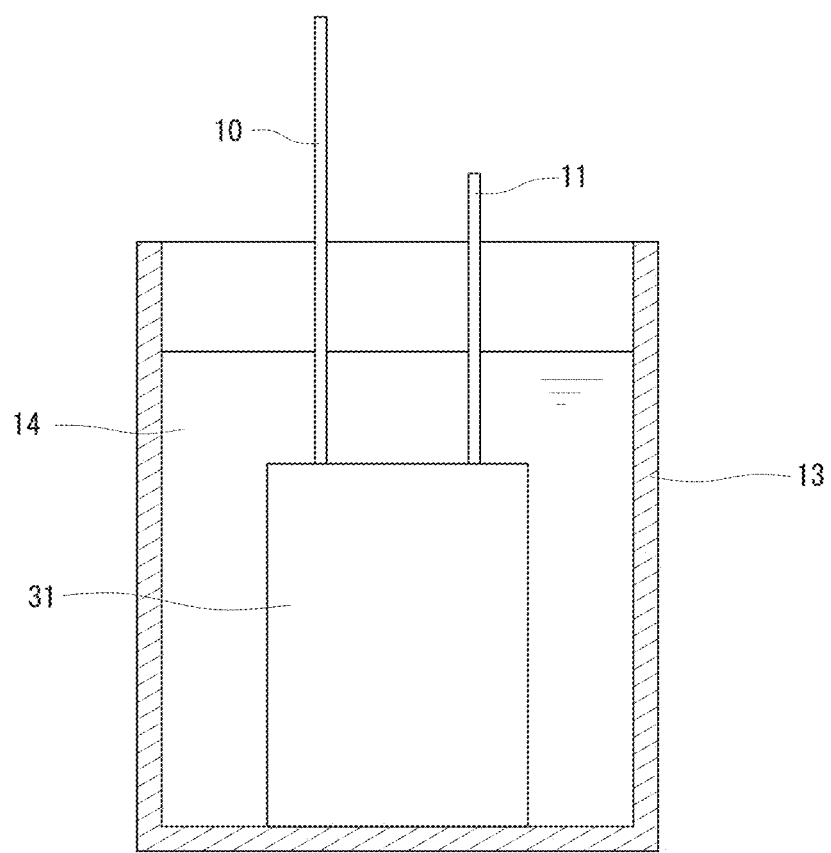
FIG. 4 is a schematic diagram showing a immersing step.
Figure 5:
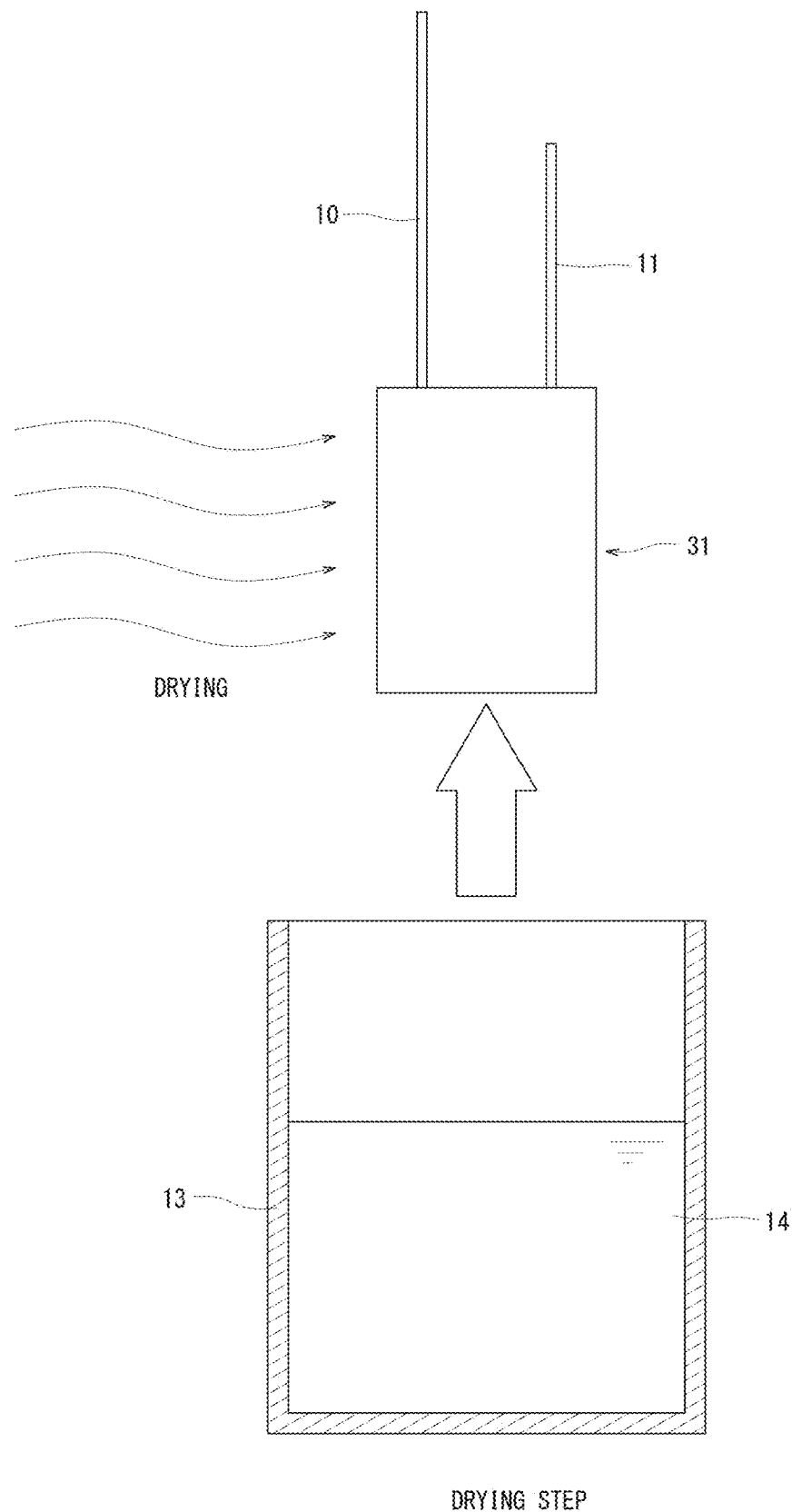
FIG. 5 is a schematic diagram showing a drying step.

The solid electrolytic capacitor A is structured as described above. Next, a manufacturing method of the solid electrolytic capacitor A will be described with reference to the relevant drawings. FIG. 3 is a schematic diagram showing a solution 14 used in an immersing step. FIG. 4 is a schematic diagram showing an immersing step. FIG. 5 is a schematic diagram showing a drying step.

As shown in FIG. 2, a separator 7, a cathode member 9 having a cathode lead terminal 11 connected to it, a separator 7, and an anode member 8 having an anode lead terminal 10 connected to it are arranged so as to be laid on each other in this order from outside, and are wound up with the anode member 8 inside. Then winding-end tape 12 is applied to the outer circumference of the separator 7. In this way, a capacitor structure 31 is built.

The capacitor structure 31 built as described above is immersed in a solution 14 that contains a water-soluble first polymer 141 and a water-dispersible second polymer 142 (immersing step: see FIG. 4). The immersing step is performed under reduced pressure. This permits the solution 14 to permeate the interior of the capacitor structure 31.

The solution 14 will now be described in detail. As shown in FIG. 3, the solution 14 is prepared by putting a water-soluble first polymer 141 and a water-dispersible second polymer 142 in a container 13 and stirring the mixture. Preferably, the content of the first polymer 141 in the solution 14 is 10% to 90%. This helps increase the capacitance of the capacitor element 3. More preferably, the content of the first polymer 141 in the solution 14 is 15% to 85%. This helps reduce the ESR.

The solution 14 is a water-soluble electrically conductive polymer, and more specifically a self-doped water soluble electrically conductive polymer, an example being SELFTRON manufactured by Tosoh Corporation. The second polymer 142 can be, for example, a polymer-dispersed liquid that is water-dispersible. Examples of the second polymer 142 include Taycatron manufactured by Tayca Co., Ltd., SEPLEGYDA manufactured by ShinEtsu Polymer Co., Ltd., and Clevios manufactured by Heraeus K.K.

Then, as shown in FIG. 5, the capacitor structure 31 is taken out of the container 13. The capacitor structure 31 is then dried in a drying step in which it is left standing in an environment of 125° C. for 30 minutes. In this way, the capacitor element 3 is manufactured (first capacitor manufacturing process). While, in the drying step shown in FIG. 5, drying proceeds under blown air, drying may be performed with no air-blowing.

In the capacitor element 3 formed through immersion in the solution 14 followed by drying, the water-soluble first polymer 141 deposits in a layer on the surfaces of the anode and cathode members 8 and 9. The first polymer 141 deposits also on the surface of the separator 7 and on the surface of the second polymer 142.

The second polymer 142 is particulate. A plurality of particles of the second polymer 142 deposit on the surface of the anode member 8 deposited with the first polymer 141 and on the surface of the cathode member 9 deposited with the first polymer 141. The second polymer 142 deposits also on the separator 7 deposited with the first polymer 141. Thus, the plurality of particles of the second polymer 142 are disposed, so as to bridge, between the surface of the anode member 8 and the surface of the separator 7 and between the surface of the cathode member 9 and the surface of the separator 7. In this way, the second polymer 142 electrically connects together the anode member 8 and the cathode member 9.

Next, the solid-at-normal-temperature substance 2 disposed inside the case 1 of the solid electrolytic capacitor A will be described. The solid-at-normal-temperature substance 2 has an electrolyte dissolved in a solvent that is solid at or below a first temperature (e.g., 30° C.) and that melts when heated to a second temperature (melting point) higher than the first temperature.

Used as the solvent contained in the solid-at-normal-temperature substance 2 is at least one of polyethylene glycol, a polyhydric alcohol, an aliphatic acid ester of glycerol, and a sugar. Examples of solvents of which the first temperature is 30° C. and the second temperature is 50° C. include polyethylene glycol, polyhydric alcohols, aliphatic acid esters of glycerol, and sugars. Examples of solvents of which the first temperature is 30° C. and the second temperature is 100° C. include sugars.

Usable as polyethylene glycol of which the first temperature is 30° C. and the second temperature is 50° C. is PEG2000 (melting point: 51° C.), PEG4000 (melting point: 56° C.), PEG6000 (melting point: 58° C.), PEG10000 (melting point: 62° C.), or PEG20000 (melting point: 63° C.). Here, PEG2000 denotes polyethylene glycol with an average molecular weight of 2000. Similar definitions apply to PEG4000, PEG6000, PEG10000, and PEG20000.

An example of polyhydric alcohols of which the first temperature is 30° C. and the second temperature is 50° C. is at least one of 1,2-dodecane diol (melting point 56 to 60° C.) and 1,12-dodecane diol (melting point 79 to 81° C.).

Examples of aliphatic acid esters of glycerol of which the first temperature is 30° C. and the second temperature is 50° C. include polyglyceryl-6 stearate (melting point 60 to 70° C.), polyglyceryl-6 tristearate (melting point 50 to 60° C.), polyglyceryl-4 pentastearate (melting point 50 to 60° C.), polyglyceryl-10 decastearate (melting point 50 to 60° C.), and polyglyceryl-10 hepta(behenate/stearate) (melting point 70 to 80° C.).

Examples of sugars of which the first temperature is 30° C. and the second temperature is 50° C. include xylitol (melting point 92° C.) and sorbitol (melting point 95° C.).

Examples of sugars of which the first temperature is 30° C. and the second temperature is 100° C. include erythritol (melting point 121° C.), lactitol (melting point 146° C.), and glucose (melting point 150° C.).

The electrolyte contained in the solid-at-normal-temperature substance 2 can be an acid or base. Examples of the acid contained as the electrolyte in the solid-at-normal-temperature substance 2 include maronic acid, succinic acid, glutaric acid, adipic acid, sebacic acid, decane-dicarboxylic acid, tartronic acid, fumaric acid, maleic acid, citraconic acid, malic acid, tartaric acid, phthalic acid, nitrophthalic acid, citric acid, tricarbanilic acid, pyromellitic acid, boric acid, phosphoric acid, borodisalicylic acid, borodiglycolic acid, trinitrophenol, hydroxynitrophenol, hydroxynitrobenzoic acid, and sulfosalicylic acid Examples of the base contained as the electrolyte in the solid-at-normal-temperature substance 2 include ammonia, monoethylamine, diethylamine, triethylamine, trimethylamine, N,N-dimethylethylamine, N,N-diethylmethylamine, monoethanolamine, diethanolamine, triethanolamine, benzylamine, naphthylamine, morpholine, aniline, acetanilide, phenanthroline, caffeine, and imidazole.

Figure 6:
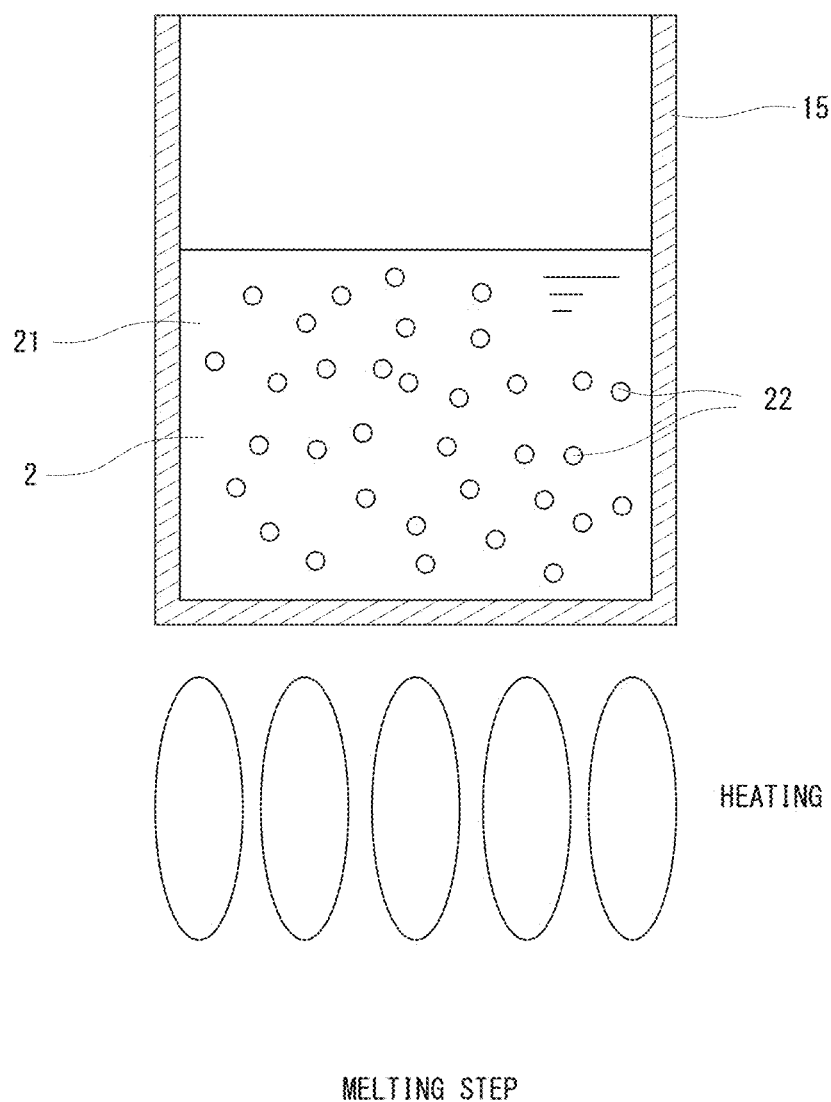
FIG. 6 is a diagram showing a melting step in which a solid-at-normal-temperature substance is heated to be melted.
Figure 7:
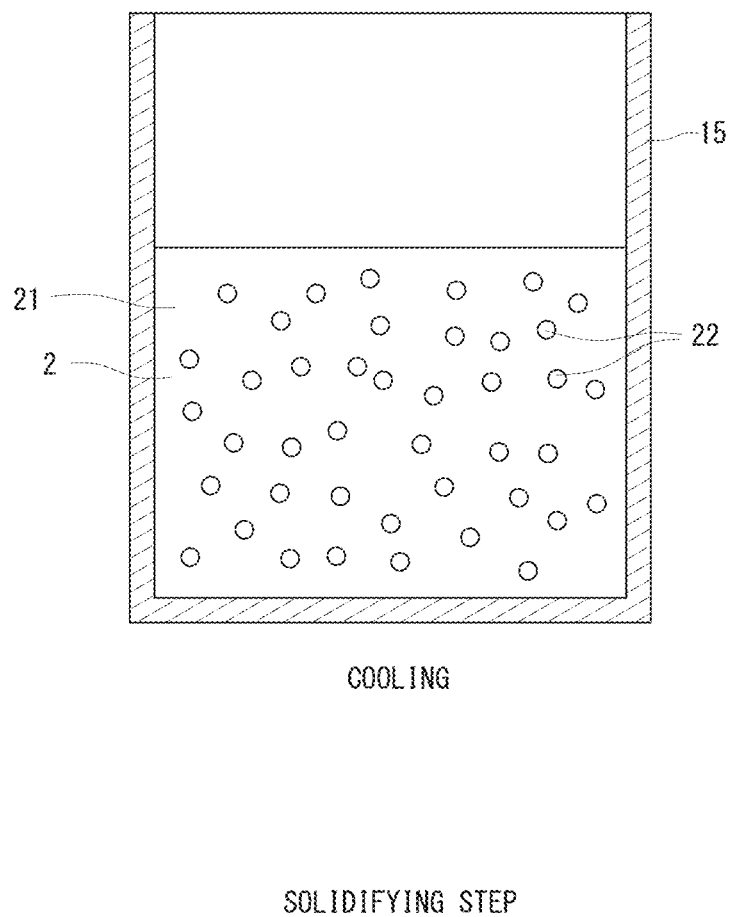
FIG. 7 is a diagram showing a solidifying step in which a solid-at-normal-temperature substance is cooled to be solidified.
Figure 8:
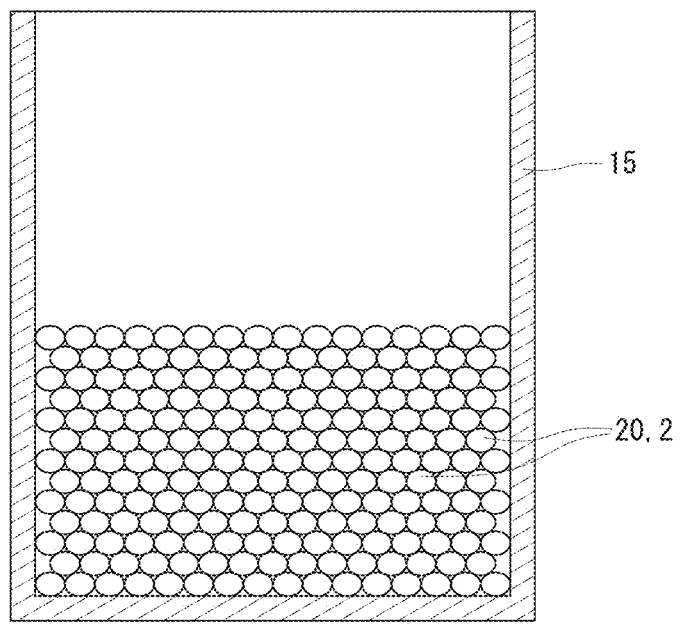
FIG. 8 is a diagram showing a pulverizing step in which a solidified solid-at-normal-temperature substance is pulverized.

Now, a manufacturing method of the solid-at-normal-temperature substance 2 will be described with reference to FIGS. 6 to 8. FIG. 6 is a diagram showing a melting step in which the solid-at-normal-temperature substance 2 is heated to be melted. FIG. 7 is a diagram showing a solidifying step in which the solid-at-normal-temperature substance 2 is cooled to be solidified. FIG. 8 is a diagram showing a pulverizing step in which the solidified solid-at-normal-temperature substance 2 is pulverized.

As shown in FIG. 6, the solvent 21 is put in a container 15, and the container 15 is heated to or above the melting point. As mentioned above, the melting point varies from solvent to solvent. Then the electrolyte 22 is put in the liquefied solvent 21. Thus a solution having the electrolyte 22 dissolved uniformly in the solvent 21 is prepared (melting step). While FIG. 6 shows an arrangement where heating is achieved by heating a bottom part of the container 15, this is not meant to be any limitation. In the melting step, the container 15 can be heated with a heater or with a high-frequency heating apparatus.

The container 15 then stops being heated and is cooled to the first temperature (e.g., here, 30° C., i.e., normal temperature) so that the solution solidifies (solidifying step: see FIG. 7). In this way, the solid-at-normal-temperature substance 2 is prepared. In the solid-at-normal-temperature substance 2, the electrolyte 22 is disposed in a form dispersed in the solvent 21.

As shown in FIG. 8, the solid-at-normal-temperature substance 2 solidified in the solidifying step is pulverized (pulverizing step). Through the pulverizing step, the solid-at-normal-temperature substance 2 is made into powder. In this way, through the melting step, the solidifying step, and the pulverizing step, powder 20 of the solid-at-normal-temperature substance is produced.

Figure 9:
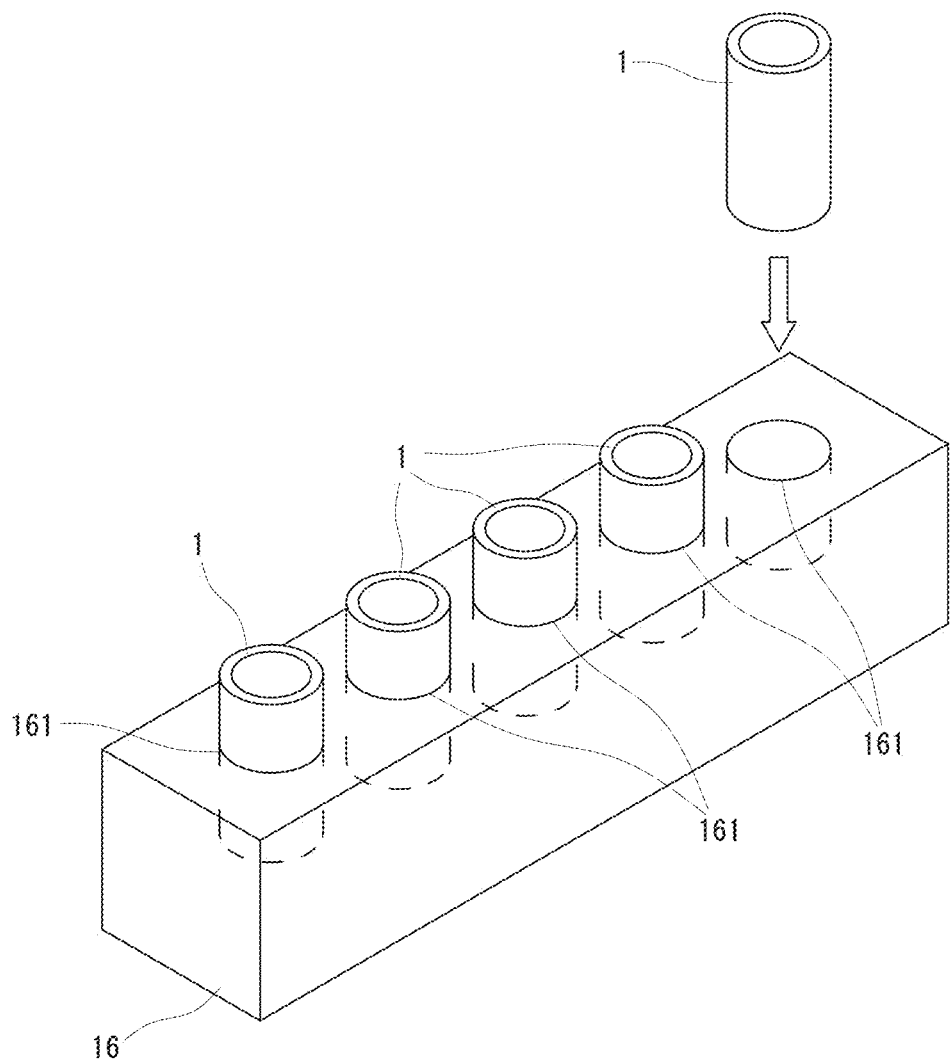
FIG. 9 is a perspective view of a heating jig.
Figure 10:
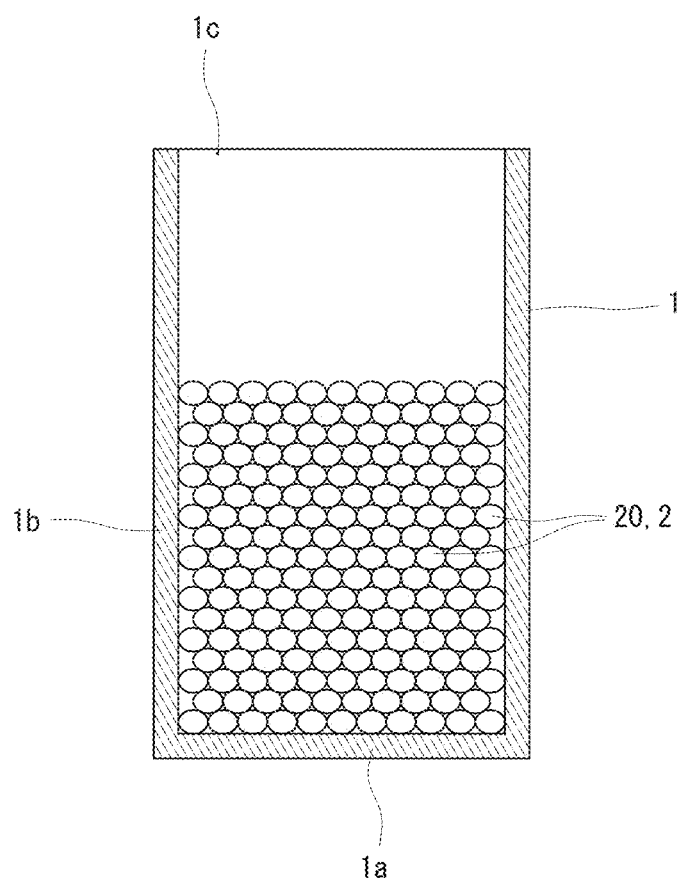
FIG. 10 is a sectional view of a case housing powder of a solid-at-normal-temperature substance in it.
Figure 11:
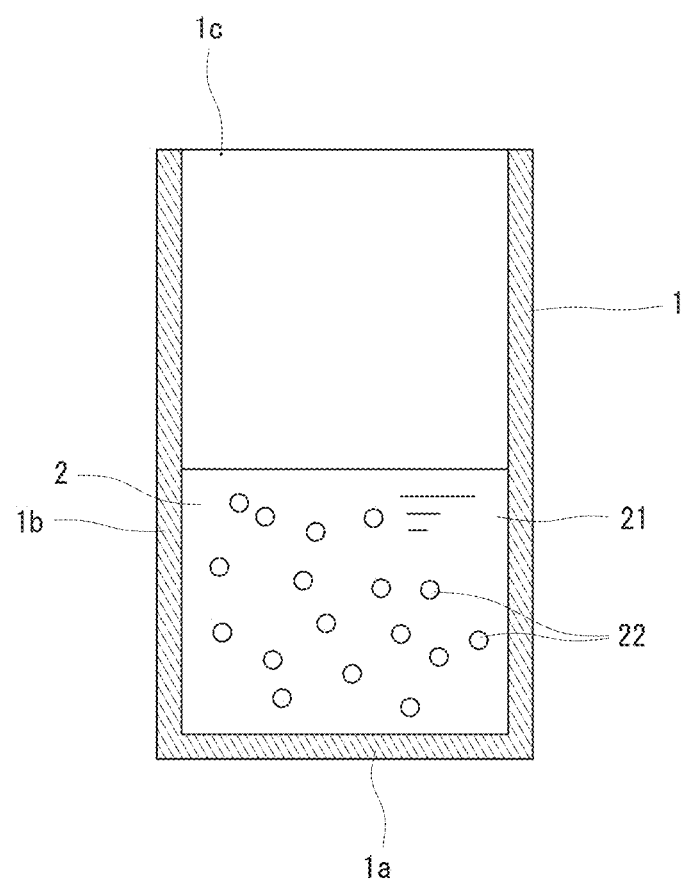
FIG. 11 is a sectional view of a case housing a solid-at-normal-temperature substance in liquid phase.
Figure 12:
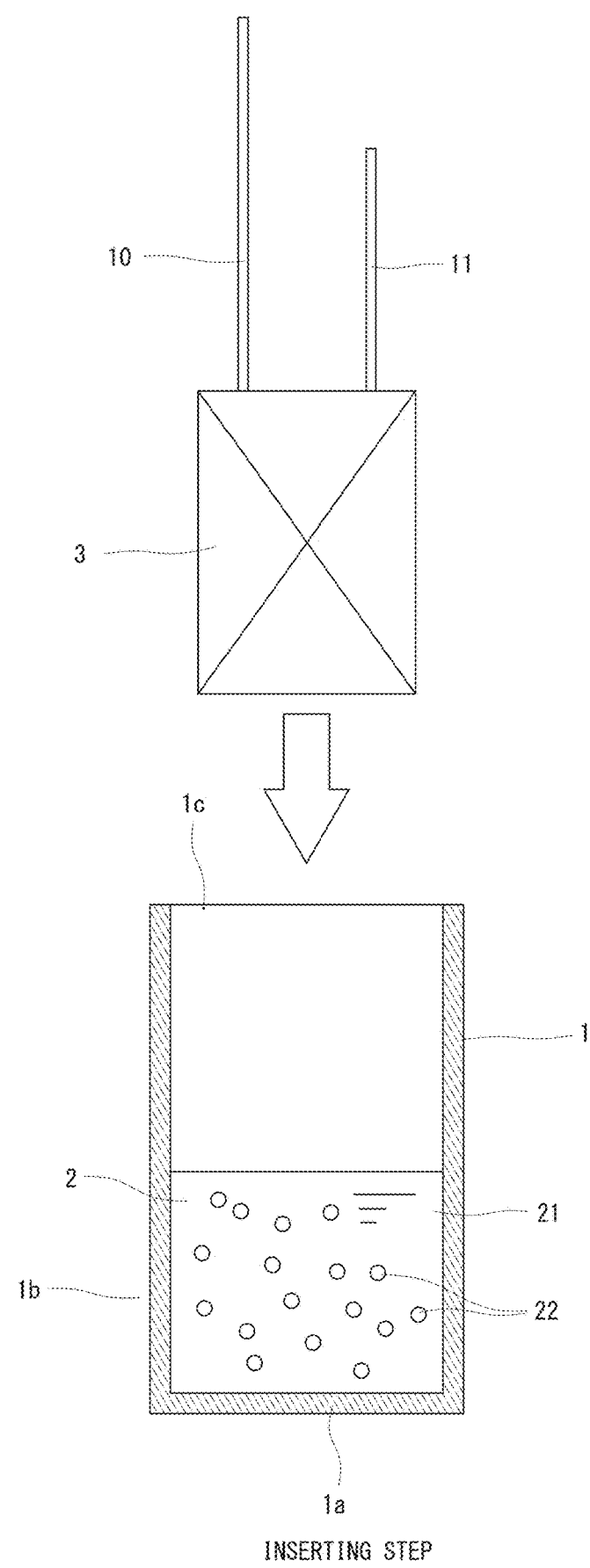
FIG. 12 is a sectional view showing how a capacitor element is housed in a case housing a solid-at-normal-temperature substance in liquid phase.
Figure 13:
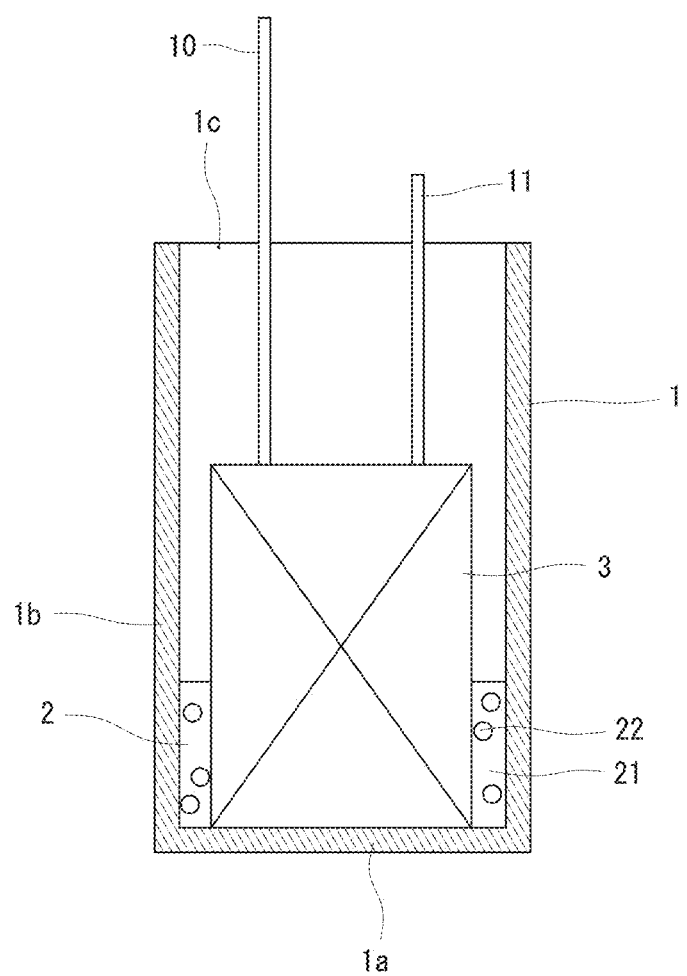
FIG. 13 is a sectional view of a case 1 housing in it a solidified solid-at-normal-temperature substance and a capacitor element.
Figure 14:
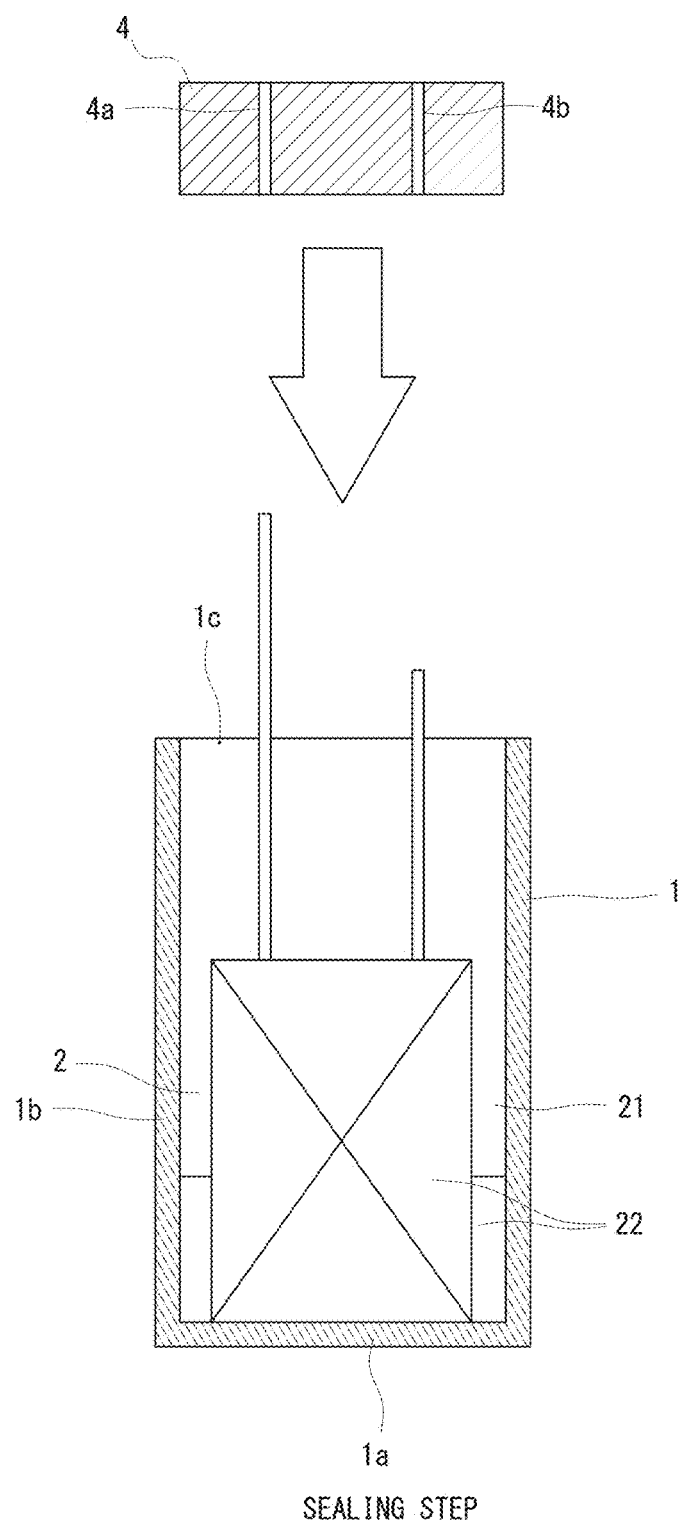
FIG. 14 is a sectional view showing a step of fitting a sealing member to a case.
Figure 15:
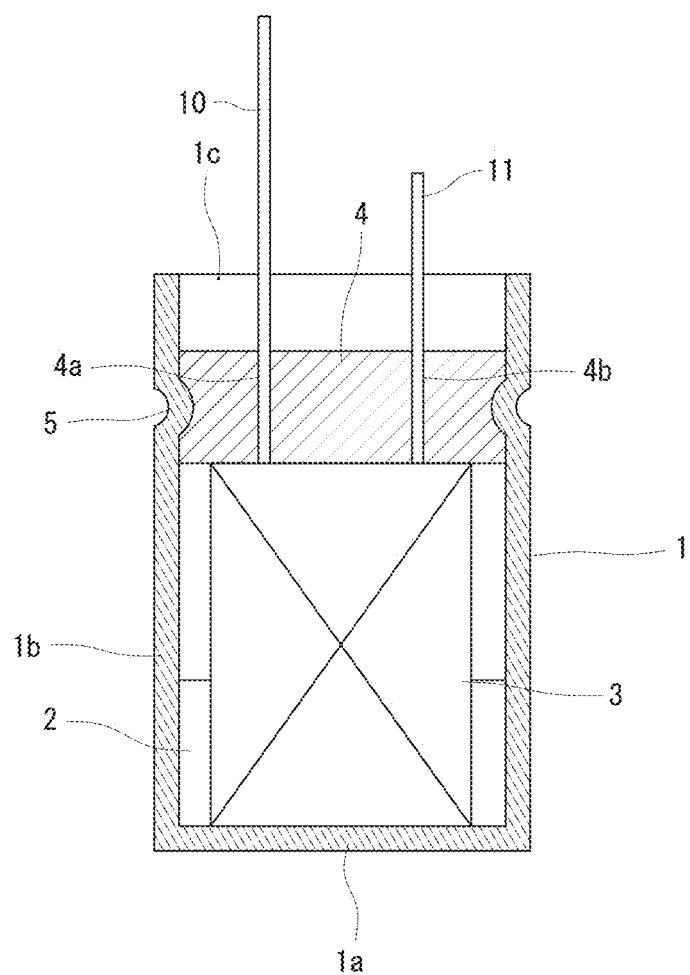
FIG. 15 is a sectional view of a case fitted with a sealing member and having a depressed portion formed in it.

Next, a procedure of housing the capacitor element 3 and the solid-at-normal-temperature substance 2 in the case 1 will be described with reference to FIGS. 9 to 15. FIG. 9 is a perspective view of a heating jig 16. FIG. 10 is a sectional view of the case 1 housing powder 20 of the solid-at-normal-temperature substance in it. FIG. 11 a sectional view of the case 1 housing the solid-at-normal-temperature substance 2 in liquid phase. FIG. 12 is a sectional view showing how the capacitor element 3 is housed in the case 1 housing the solid-at-normal-temperature substance 2 in liquid phase. FIG. 13 is a sectional view of the case 1 housing in it the solidified solid-at-normal-temperature substance 2 and the capacitor element 3. FIG. 14 is a sectional view showing a process of fitting the sealing member 4 to the case 1. FIG. 15 is a sectional view of the case 1 having the sealing member 4 fitted to it and having depressed portion 5 formed in it.

In the manufacturing process of the solid electrolytic capacitor A, powder 20 of the solid-at-normal-temperature substance is housed in the case 1, then the case 1 is heated to or above the second temperature to melt the solid-at-normal-temperature substance 2, then the capacitor element 3 is inserted in the case 1, and then these are cooled.

In this manufacturing process, a heating jig 16 is used to hold and heat the case 1. The heating jig 16 is formed of a material with high rigidity and high thermal conductivity, such as steel and brass. The heating jig 16 shown in FIG. 9 is a rectangular parallelepiped member. The heating jig 16 has a plurality of, here five, holes 161 formed in its top face.

The hole 161 is shaped such that the case 1 can be accommodated in it and has here a cylindrical shape. The heating jig 16 heats the case 1 accommodated in the hole 161. The heating jig 16 can achieve heating by electrical heating such as heating using electrical resistance or high-frequency induction heating. This, however, is not meant as any limitation. For example, the heating jig 16 having accommodated in the hole 161 the case 1 housing powder 20 of the solid-at-normal-temperature substance can be placed in a high-temperature environment such as in an oven to heat the case 1 and the solid-at-normal-temperature substance 2.

As shown in FIG. 10, powder 20 of the solid-at-normal-temperature substance is housed in a case 1 accommodated in a hole 161 of the heating jig 16. Making the solid-at-normal-temperature substance 2 into powder in the pulverizing step makes the solid-at-normal-temperature substance 2 easy to house in the case 1 at normal temperature.

Then heating the case 1 across the heating jig 16 until the solid-at-normal-temperature substance 2 is heated to the second temperature causes the solid-at-normal-temperature substance 2 to melt (re-melting step). Thus, as shown in FIG. 11, the solid-at-normal-temperature substance 2 in the case 1 is liquefied.

Then, as shown in FIG. 12, the capacitor element 3 is, with the anode lead terminal 10 and the cathode lead terminal 11 up, inserted in the case 1 housing the solid-at-normal-temperature substance 2 in liquid phase (inserting step). The solid-at-normal-temperature substance 2 in liquid phase penetrates the interior of the capacitor element 3 by capillary action. This results in the solid-at-normal-temperature substance 2 in liquid phase being disposed between the surface of the anode member 8 and the surface of the cathode member 9, on the surface of the separator 7, and between the inner face of the case 1 and the separator 7 at the outer circumference of the capacitor element 3 (re-solidifying step).

After that, the heating of the case 1 with the heating jig 16 is stopped, and the case 1 is cooled. When cooling proceeds until the temperature of the solid-at-normal-temperature substance 2 inside the case 1 falls to or below the first temperature (normal temperature: here, 30° C.), the solid-at-normal-temperature substance 2 in solid phase is disposed in the case 1. Thus, between the surface of the anode member 8 and the surface of the cathode member 9, on the surface of the separator 7, and between the inner face of the case 1 and the separator 7 at the outer circumference of the capacitor element 3, the solid-at-normal-temperature substance 2 is disposed that is solid at or below the first temperature (normal temperature, i.e., 30° C.) and that melts when heated to the second temperature higher than the first temperature.

After sufficient cooling, the case 1 is taken out of the heating jig 16. Then the sealing member 4 is fitted in the opening 1c of the case 1 (sealing step: see FIG. 14). The sealing member 4 has the through holes 4a and 4b. The anode lead terminal 10 is put through the through hole 4a and the cathode lead terminal 11 is put through the through hole 4b. Thus, the opening 1c in the case 1 is sealed. Here, when the anode lead terminal 10 and the cathode lead terminal 11 are put through the through holes 4a and 4b, they are brought into close contact with the sealing member 4 to keep the inside airtight.

As shown in FIG. 15, with the sealing member 4 fitted in the opening 1c in the case 1, the circumferential face of the case 1 is swaged to form the depressed portion 5. Moreover, the open end of the case 1 is folded inward to form the contact portion 6 (FIG. 1), and the contact portion 6 makes contact with the sealing member 4. This prevents the sealing member 4 from moving relative to the case 1. Through the manufacturing procedure described above, the solid electrolytic capacitor A is produced.

In the solid electrolytic capacitor A according to this embodiment, the surface of the anode member 8 is deposited with the first polymer 141. The surface of the cathode member 9 is deposited with the first polymer 141. Between the surfaces of the anode and cathode members 8 and 9 that are deposited with the first polymer, the second polymer 142 is disposed so as to electrically connect together the surfaces of the anode and cathode members 8 and 9. Thus, in the solid electrolytic capacitor A, even with no electrolyte, the anode and the cathode conduct to each other. This helps keep the ESR of the solid electrolytic capacitor A low. Moreover, in the solid electrolytic capacitor A of this embodiment, with no liquid electrolyte sealed in the case 1, deterioration of capacitor characteristics ascribable to evaporation of a liquid electrolyte is suppressed. That is, the solid electrolytic capacitor A can keep satisfactory capacitor characteristics for a long period.

During the use of the solid electrolytic capacitor A, if the oxide film on the surface of the anode member 8 cracks or peels off, a leak current occurs in the affected part and raises the temperature of where the leak current is present. This rise in temperature liquefies the solvent 21 in the solid-at-normal-temperature substance 2. Then the electrolyte 22 contained in the solid-at-normal-temperature substance 2 repairs the oxide film. The repaired oxide film suppresses the leak current. Thus, the temperature around falls and the solid-at-normal-temperature substance 2 solidifies. This too helps suppress deterioration of the capacitor characteristics of the solid electrolytic capacitor A for a long period.

Moreover, between the inner face of the case 1 and the outer face of the capacitor element 3, the solid-at-normal-temperature substance 2 is disposed. Thus, the capacitor element 3 is held on the inner face of the case 1 by the solid-at-normal-temperature substance 2. As a result, an external force such as impact and vibration that acts on the solid electrolytic capacitor A is less likely to be transmitted to the capacitor element 3, and this helps suppress deterioration of the capacitor element 3 ascribable to an external force. In this way it is possible to suppress deterioration of the capacitor characteristics of the solid electrolytic capacitor A for a long period.

The solid electrolytic capacitor A may be used in a high-temperature environment. In such a case, the temperature inside the case 1 of the solid electrolytic capacitor A may rise to or above the second temperature (the melting point of the solvent 21). If this happens, the solid-at-normal-temperature substance 2 melts and liquefies. The liquefied solid-at-normal-temperature substance 2 has higher viscosity than known liquid electrolyte. Accordingly, even if the solid-at-normal-temperature substance 2 inside the case 1 liquefies as a result of a rise in temperature, an external force such as vibration and impact is prevented from being transmitted to the capacitor element 3. That is, an external force such as impact and vibration that acts on the solid electrolytic capacitor A is less likely to be transmitted to the capacitor element 3, and this helps suppress deterioration of the capacitor element 3 ascribable to an external force. In this way it is possible to suppress deterioration of the capacitor characteristics of the solid electrolytic capacitor A for a long period.

Take, for example, PEG6000 (melting point 58° C.) as the solvent 21 in the solid-at-normal-temperature substance 2. The dynamic viscosity of PEG6000 at 80° C. is about 1000 mm$^2$/s, which is about 1000 times as high as the dynamic viscosity (about 1 mm$^2$/s) of water (a component in a liquid electrolyte) at 80° C. Owing to this, if in the use environment of the solid electrolytic capacitor A the temperature inside the case 1 rises to or above the second temperature, the capacitor element 3 is less likely to suffer lead terminal breakage in response to vibration caused by an external force.

Figure 16:
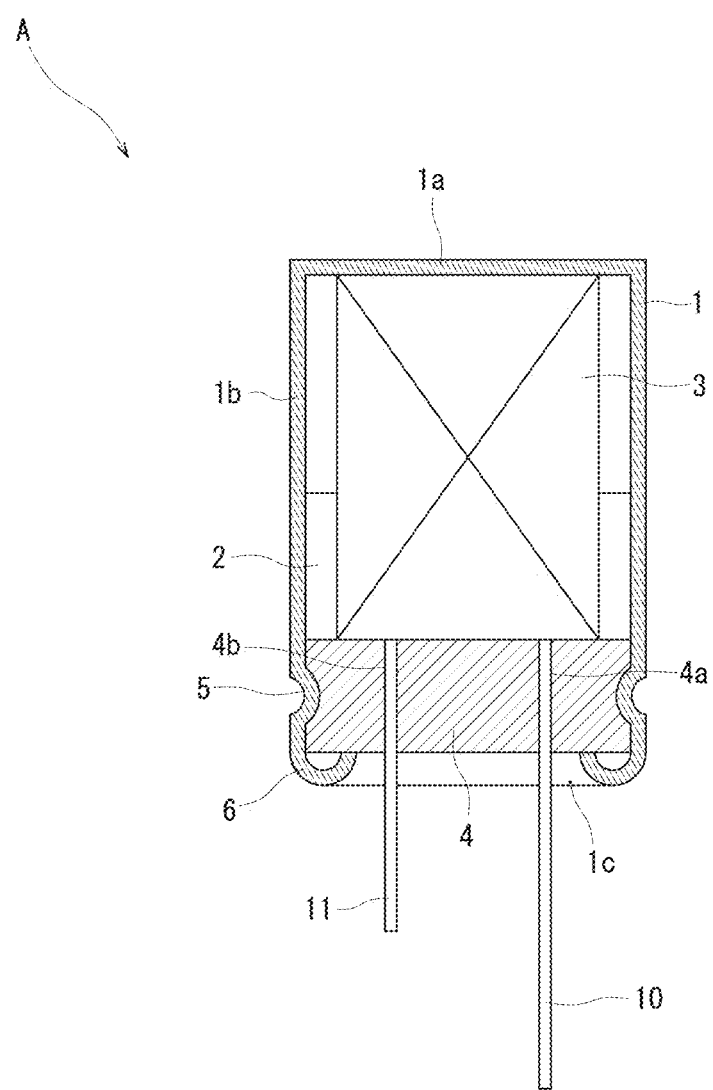
FIG. 16 is a diagram showing aging.

FIG. 16 is a diagram showing aging. Capacitors are subjected to aging to stabilize their characteristics. Aging will now be described. As shown in FIG. 16, the solid electrolytic capacitor A is held with the anode lead terminal 10 and the cathode lead terminal 11 down. Then the solid electrolytic capacitor A is heated to or above the second temperature at which the solvent 21 in the solid-at-normal-temperature substance 2 melts. In this state, a predetermined voltage is applied between the anode lead terminal 10 and the cathode lead terminal 11 for a predetermined length of time.

In this aging, when the temperature of the solid-at-normal-temperature substance 2 in the solid electrolytic capacitor A reaches the second temperature, the solvent 21 in the solid-at-normal-temperature substance 2 melts and flows down toward the sealing member 4. After aging, the solid electrolytic capacitor A is cooled and, when the temperature of the solid-at-normal-temperature substance 2 falls to or below the first temperature (normal temperature), the solid-at-normal-temperature substance 2 solidifies near the sealing member 4 (see FIG. 16).

That is, in the solid electrolytic capacitor A, immediately after its manufacture, that is, before aging, the solid-at-normal-temperature substance 2 is located at the bottom portion 1a side in the case 1. In aging, the solid-at-normal-temperature substance 2 moves toward the sealing member 4 in the case 1. Meanwhile, the outer circumferential face of the capacitor element 3 is held on the inner face of the case 1 by the solid-at-normal-temperature substance 2. Thus, an external force such as impact and vibration is less likely to be transmitted to the capacitor element 3, and this helps suppress deterioration of the capacitor element 3 ascribable to external force. In this way it is possible to suppress deterioration o the capacitor characteristics of the solid electrolytic capacitor A for a long period.

As mentioned above, the interior of the capacitor element 3 is permeated with the solid-at-normal-temperature substance 2. In aging, the solid-at-normal-temperature substance 2 that permeates the capacitor element 3 melts and liquefies. The liquefied solid-at-normal-temperature substance 2 is held inside the capacitor element 3 by capillary action between the separator 7, the anode member 8, and the cathode member 9 constituting the capacitor element 3 and is prevented from flowing out of the capacitor element 3. Thus, the oxide film on the anode member 8 is less likely to be restrained from being repaired. That is, in the solid electrolytic capacitor A, deterioration of capacitor characteristics is suppressed for a long period regardless of whether it is subjected to aging.

Figure 17:
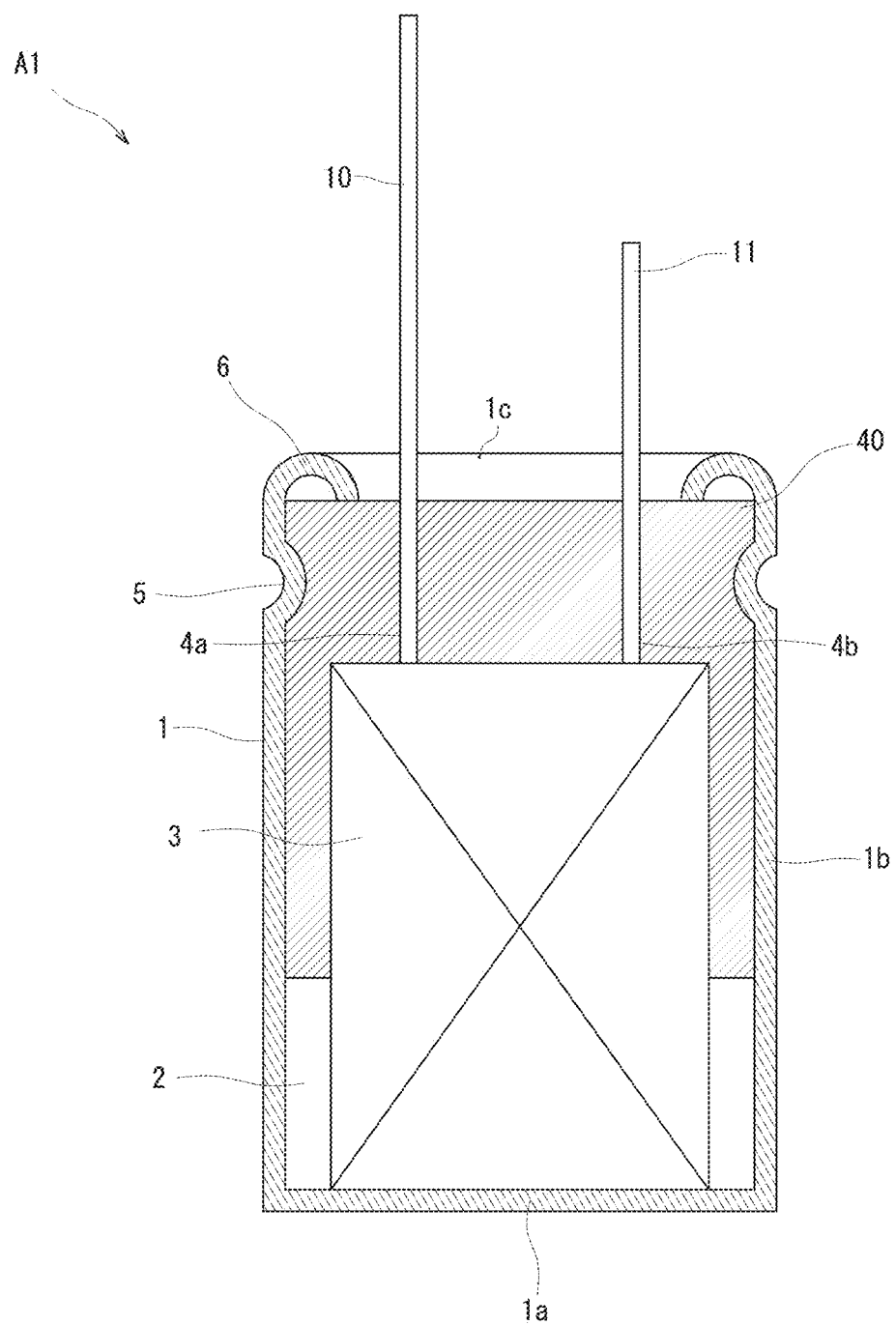
FIG. 17 is a diagram showing a solid electrolytic capacitor according to another embodiment of the present invention.

FIG. 17 is a diagram showing a solid electrolytic capacitor A1 according to another embodiment of the present invention. As in the solid electrolytic capacitor A1 shown in FIG. 17, in place of the sealing member 4 made of rubber, resin may be poured in through the opening 1c in the case 1 to form a sealing member 40 made of resin. Owing to no electrolyte being housed inside the case 1, even a sealing member 40 made of resin provides satisfactory sealing of the opening 1c in the case 1.

Practical Examples

Specific examples (Practical Examples 1 to 4) of the solid electrolytic capacitor A structured as described above will now be presented.

Practical Example 1

First, PEG10000 (melting point: 62° C.) as a solvent 21 was put in a container 15 as shown in FIG. 6. Then the solvent 21 was heated to above its melting point, specifically to 80° C. After that, trimethylamine borodisalicylate as an electrolyte 22 was put in the melted, liquefied solvent 21, and the mixture was stirred so that the electrolyte 22 was substantially uniformly dissolved in the solvent 21 to obtain a solid-at-normal-temperature substance 2 in liquid phase. Here, the solid-at-normal-temperature substance 2 was a solution that contained the electrolyte 22 in a concentration of 15%. That is, in the solid-at-normal-temperature substance 2 in liquid phase, an amount of electrolyte 22 corresponding to a concentration of 15% was put in the solvent 21.

Then, as shown in FIG. 7, the container 15 stopped being heated and was cooled to or below normal temperature (e.g., 30° C.) to obtain the solid-at-normal-temperature substance 2 in solid phase. Next, as shown in FIG. 8, the solid-at-normal-temperature substance 2 in the container 15 was pulverized to obtain powder 20 of the solid-at-normal-temperature substance.

On the other hand, the capacitor element 3 was fabricated through the following procedure. First, separators 7, an anode member 8, and a cathode member 9 were laid on each other. Then they were wound up with the anode member 8 inside and the outer separator 7 was fastened with tape 12 to build a capacitor structure 31. The capacitor structure 31 was then immersed in a water solution of ammonium adipate in a chemical conversion treatment bath, and a voltage of 60 V was applied between the anode lead terminal 10 and the chemical conversion treatment liquid for 15 minutes. In this way the oxide film on the surface of the anode member 8 was repaired, and then the capacitor structure 31 was dried at 125° C. for 30 minutes. In this state, the capacitor structure 31 had the capability of a capacitor of 35 V, 270 μF.

The capacitor structure 31 was then immersed in a polymer solution which was a mixture of 25 parts of a water solution of a self-doped water soluble electrically conductive polymer (SELFTRON manufactured by Tosoh Corporation) as a first polymer 141 and 75 parts of a water dispersion of a thiophene-based electrically conductive polymer (manufactured by Heraeus K.K.) as a substance containing a second polymer 142. The capacitor structure 31 was taken out of the polymer solution and was dried in an atmosphere of 125° C. for 30 minutes. In this way, a capacitor element 3 having the first polymer 141 and the second polymer 142 deposited on the surfaces of the separators 7, the anode member 8, and the cathode member 9 was fabricated. The first and second polymers were formed.

After that, 120 mg of powder 20 of the solid-at-normal-temperature substance was put in a case 1 with a diameter of 10 mm and a height of 10.5 mm. Then the case 1 having powder 20 of the solid-at-normal-temperature substance housed in it was set in a hole 161 in a heating jig 16. The case 1 was then heated to 80° C. to melt the solid-at-normal-temperature substance 2 inside the case 1. Now the case 1 housed the solid-at-normal-temperature substance 2 in liquid phase.

Then the capacitor element 3 was inserted through the opening 1c. Here, the capacitor element 3 was supported such that part of the capacitor element 3 was immersed in the solid-at-normal-temperature substance 2 in liquid phase. Heating was then stopped to lower temperature and the solid-at-normal-temperature substance 2 in the case 1 solidified. Then the anode lead terminal 10 and the cathode lead terminal 11 were put through holes 4a and 4b in a sealing member 4 made of butyl rubber. Then a depressed portion 5 and a contact portion 6 were formed in the case 1. In this way a solid electrolytic capacitor A was produced.

After that, the solid electrolytic capacitor A thus produced was held with the anode lead terminal 10 and the cathode lead terminal 11 down. The solid electrolytic capacitor A in this state was placed in an environment of about 125° C. and was subjected to aging with a predetermined voltage applied between the anode lead terminal 10 and the cathode lead terminal 11 for one hour. In this way, a solid electrolytic capacitor A of Practical Example 1 was fabricated.

Even in the solid electrolytic capacitor A fabricated as described above, owing to the presence of the solid-at-normal-temperature substance 2 between the inner face of the case 1 and the outer face of the capacitor element 3, the capacitor element 3 is securely held in the case 1. Moreover, owing to the presence of the solid-at-normal-temperature substance 2 between the case 1 and the capacitor element 3, transmission of an external force ascribable to impact, vibration, or the like acting on the case 1 to the capacitor element 3 is suppressed. This suppresses deterioration of the capacitor element 3 ascribable to an external force.

Figure 18:
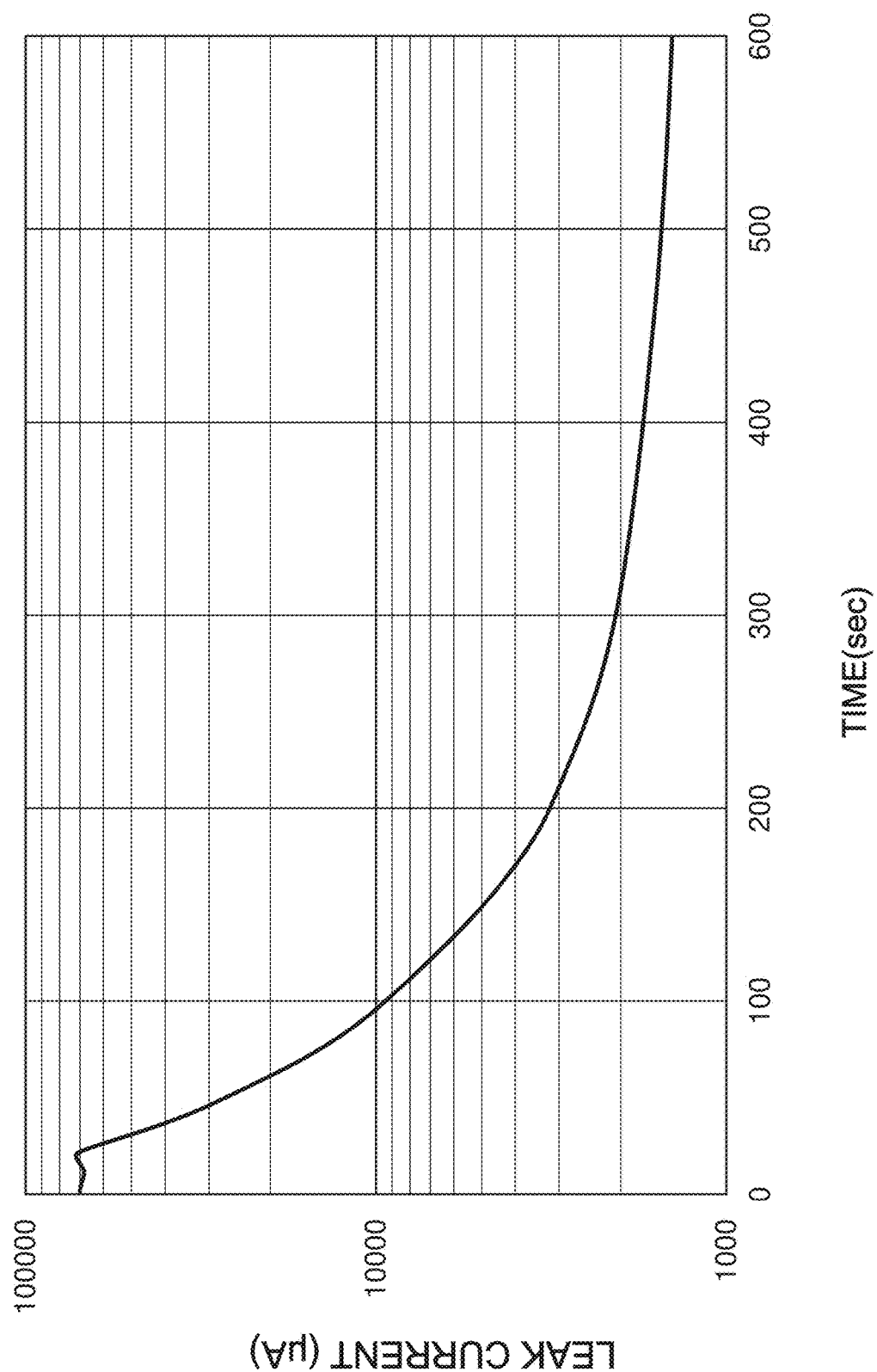
FIG. 18 is a diagram showing the results of a test for checking the capability of repairing an oxide film in the solid electrolytic capacitor of Practical Example 1.

A test was performed to check the capability of repairing the oxide film on the surface of the anode member 8 in the solid electrolytic capacitor A of practical example 1. FIG. 18 is a graph showing the results of the test for checking the capability of repairing the oxide film in the solid electrolytic capacitor A of practical example 1.

First, the method and details of the test will be described. As mentioned above, in the solid electrolytic capacitor A, if the oxide film on the surface of the anode member 8 is damaged, a leak current LC occurs in a concentrated fashion from the damaged part of the oxide film. That is, a high leak current LC occurs. When a given period of time elapses with the leak current passing, the temperature around the damaged part of the oxide film rises, and the solid-at-normal-temperature substance 2 is heated and liquefies. The electrolyte 22 contained in the solid-at-normal-temperature substance 2 in liquid phase repairs the oxide film. As the repair proceeds, the leak current reduces.

In light of this phenomenon, it is possible to detect a leak current in the solid electrolytic capacitor A and, based on the variation of the leak current LC, to check the repair of the oxide film on the surface of the anode member 8. Accordingly, in the test, with a predetermined voltage applied, a leak current is detected and the variation of the leak current resulting from the repair of the oxide film was checked.

In the test, a solid electrolytic capacitor A was prepared in which the oxide film in an end part of the anode member 8 in the capacitor element 3 had not been repaired, that is, the anode member 8 was exposed there. Then, at normal temperature, a voltage of 25 V was applied between the anode lead terminal 10 and the cathode lead terminal 11. While the voltage was kept being applied, the leak current LC was measured. Then, based on the variation of the leak current LC, the repair of the oxide film on the anode member 8 was checked.

In the graph in FIG. 18, the vertical axis represents the leak current LC (μA) and the horizontal axis represents the time elapsed from the start of the test. In the graph in FIG. 18, the vertical axis is logarithmic. The graph reveals the following. At the start of the test, a high leak current LC (in FIG. 18, about 70000 μA) was passing. The high leak current LC kept passing for about 30 seconds. At the lapse of about 30 seconds from the start of the test, the leak current starts to reduce sharply and, as time lapsed further, converged at a fixed level of current.

This can be explained as follows. Immediately after the start of the test, since part of the anode member 8 was exposed, a leak current LC occurred in a concentrated fashion in the exposed part of the anode member 8. Thus, immediately after the start of the test, a high leak current LC passed. Immediately after the start of the test, the Joule heat ascribable to the high leak current LC heated the anode member 8. As the temperature of the anode member 8 rose, the temperature of the solid-at-normal-temperature substance 2 too rose. After that, when the solid-at-normal-temperature substance 2 was heated to the second temperature, the solvent 21 in the solid-at-normal-temperature substance 2 melted, the solid-at-normal-temperature substance 2 turned into liquid phase. The time that elapsed after the start of the test until the solid-at-normal-temperature substance 2 melted into the solid-at-normal-temperature substance 2 in liquid phase was considered to be 30 seconds.

The electrolyte 22 contained in the solid-at-normal-temperature substance 2 in liquid phase repaired the oxide film on the surface of the anode member 8. As the oxide film on the surface of the anode member 8 was repaired, the exposed part of the cathode member 9 diminished and the leak current reduced. It is thus considered that, at the lapse of about 30 seconds after the start of the test, the electrolyte 22 in the solid-at-normal-temperature substance 2 started to repair the oxide film on the surface of the anode member 8.

Then, as time elapsed, that is, as repair proceeded, the leak current LC reduced. As the leak current LC reduced, the temperature of the anode member 8 lowered and the temperature of the solid-at-normal-temperature substance 2 too lowered. As time elapsed, the leak current LC reduced and the amount of heat generated by the anode member 8 reduced. As a result, the solid-at-normal-temperature substance 2 was cooled and, when the solid-at-normal-temperature substance 2 was cooled to or below the first temperature, it solidified. As the oxide film was repaired, the solid-at-normal-temperature substance 2 solidified, and this kept the leak current LC low.

Thus the following has been found out. In the solid electrolytic capacitor A, even if the oxide film on the anode member 8 is damaged and the anode member 8 is exposed, the electrolyte 22 contained in the solid-at-normal-temperature substance 2 repairs the oxide film. As a result, in the solid electrolytic capacitor A, deterioration of capacitor characteristics is suppressed for a long period.

Practical Example 2

In Practical Example 2, as the solvent 21 in the solid-at-normal-temperature substance 2, polyglyceryl-4 pentastearate (melting point 50 to 60° C.) was used. The solvent 21 was heated to above the melting point of the solvent 21, specifically to 100° C. Then trimethylamine borodisalicylate as an electrolyte 22 was put in the melted, liquefied solvent 21, and the mixture was stirred so that the electrolyte 22 was substantially uniformly dissolved in the solvent 21 to obtain a solid-at-normal-temperature substance 2 in liquid phase. Here, the solid-at-normal-temperature substance 2 was a solution that contained the electrolyte 22 in a concentration of 15%. That is, in the solid-at-normal-temperature substance 2 in liquid phase, an amount of electrolyte 22 corresponding to a concentration of 15% was put in the solvent 21. Otherwise the configuration here was similar to that of Practical Example 1. The solid electrolytic capacitor of Practical Example 2 so configured was found to produce an effect similar to that of Practical Example 1.

Practical Example 3

In Practical Example 3, as the solvent 21 in the solid-at-normal-temperature substance 2, sorbitol (melting point 95° C.) was used. The solvent 21 was heated to above the melting point of the solvent 21, specifically to 115° C. Then trimethylamine borodisalicylate as an electrolyte 22 was put in the melted, liquefied solvent 21, and the mixture was stirred so that the electrolyte 22 was substantially uniformly dissolved in the solvent 21 to obtain a solid-at-normal-temperature substance 2 in liquid phase. Here, the solid-at-normal-temperature substance 2 was a solution that contained the electrolyte 22 in a concentration of 15%. That is, in the solid-at-normal-temperature substance 2 in liquid phase, an amount of electrolyte 22 corresponding to a concentration of 15% was put in the solvent 21. Otherwise the configuration here was similar to that of Practical Example 1. The solid electrolytic capacitor of Practical Example 2 so configured was found to produce an effect similar to that for Practical Example 1.

Practical Example 4

In Practical Example 4, as the solvent 21 in the solid-at-normal-temperature substance 2, glucose (melting point 150° C.) was used. The solvent 21 was heated to above the melting point of the solvent 21, specifically to 170° C. Then trimethylamine borodisalicylate as an electrolyte 22 was put in the melted, liquefied solvent 21, and the mixture was stirred so that the electrolyte 22 was substantially uniformly dissolved in the solvent 21 to obtain a solid-at-normal-temperature substance 2 in liquid phase. Here, the solid-at-normal-temperature substance 2 was a solution that contained the electrolyte 22 in a concentration of 15%. That is, in the solid-at-normal-temperature substance 2 in liquid phase, an amount of electrolyte 22 corresponding to a concentration of 15% was put in the solvent 21. Otherwise the configuration here was similar to that of Practical Example 1. The solid electrolytic capacitor of Practical Example 2 so configured was found to produce an effect similar to that for Practical Example 1.

In the embodiment described above, the capacitor element 3 is manufactured by a manufacturing method (here called a first manufacturing method) as follows. The formation of a first polymer 141 and a water-dispersible second polymer 142 in a capacitor structure 31 proceeds by immersing it in a solution 14 in which the first polymer 141 and the second polymer 142 are stirred together, then taking the capacitor structure 31 out of the solution 14, and then drying it in an atmosphere of 125° C. for 30 minutes. In this way, a capacitor element 3 is fabricated. This manufacturing method of the capacitor element 3 is referred to as the first manufacturing method.

The capacitor element 3 can be manufactured by another manufacturing method, namely a second manufacturing method different from the first manufacturing method. Specifically, in the second manufacturing method, a capacitor structure 31 is immersed in a solution 14 containing a first polymer 141. After that, the capacitor structure 31 is taken out of the solution 14 and is dried in an atmosphere of 125° C. for 30 minutes. Next, the dried capacitor structure 31 is immersed in a solution 14 containing a second polymer 142. After that, the capacitor element 3 is taken out of the solution 14 and is dried in an atmosphere of 125° C. for 30 minutes. So configured, the second manufacturing method, though requiring two stages, too allows formation of the first polymer 141 and the second polymer 142 in the capacitor element 3.

The capacitor element 3 can be manufactured by yet another manufacturing method, namely a third manufacturing method different from either of the first and second manufacturing methods. Specifically, in the third manufacturing method, a capacitor structure 31 is immersed in a solution 14 containing a second polymer 142. After that, the capacitor structure 31 is taken out of the solution 14 and is dried in an atmosphere of 125° C. for 30 minutes. Next, the dried capacitor structure 31 is immersed in a solution 14 containing a first polymer 141. After that, the capacitor element 3 is taken out of the solution 14 and is dried in an atmosphere of 125° C. for 30 minutes. So configured, the third manufacturing method, though requiring two stages, too allows formation of the first polymer 141 and the second polymer 142 in the capacitor element 3.

Use of a capacitor element 3 manufactured by any of the three manufacturing methods described above resulted in the solid electrolytic capacitor A exhibiting good values in all its representative characteristics (capacitance, tan δ, and ESR). With any of the three manufacturing methods described above, the first polymer 141 is deposited in a layer on the surfaces of the anode and cathode members 8 and 9 in the capacitor element 3. Moreover, it is understood that the second polymer 142 is present between the surfaces of the anode and cathode members 8 and 9 deposited with the first polymer 141 in a layer, so as to electrically connect together the surfaces of the anode and cathode members 8 and 9. As a result, the solid electrolytic capacitor A exhibits good values in all its representative characteristics (capacitance, tan δ, and ESR).

From what has been described above, it can be understood that what is of significance in the capacitor element 3 of the solid electrolytic capacitor A is: the first polymer 141 is deposited in a layer on the surfaces of the anode and cathode members 8 and 9; and the second polymer 142 is present between the surfaces of the anode and cathode members 8 and 9 deposited with the first polymer 141 in a layer, so as to electrically connect together the surfaces of the anode and cathode members 8 and 9.

REFERENCE SIGNS LIST 1 solid electrolytic capacitor
A1 solid electrolytic capacitor
1 case
1a bottom portion
1b tubular portion
1c opening
2 solid-at-normal-temperature substance
20 powder of a solid-at-normal-temperature substance
21 solvent
22 electrolyte
3 capacitor element
31 capacitor structure
4 sealing member
4a. 4b through hole
40 sealing member
5 depressed portion
6 contact portion
7 separator
8 anode member
9 cathode member
10 anode lead terminal
11 cathode lead terminal
12 tape
13 container
14 solution
141 first polymer
142 second polymer
15 container
16 heating jig
161 hole

The invention claimed is:

1. A solid electrolytic capacitor, comprising:
a case in a shape of a bottomed tube with an opening;
a capacitor element having an anode member and a cathode member wound up with a separator in between, the capacitor element being housed in the case; and
a sealing member that seals the opening, wherein the capacitor element has:
a water-soluble first polymer disposed on a surface of the anode member, on a surface of the cathode member, and on a surface of the separator; and
a water-dispersible second polymer disposed on the surface of the anode member on which the first polymer is disposed and on the surface of the cathode member on which the first polymer is disposed,
wherein the second polymer electrically connects together the surface of the anode member and the surface of the cathode member, and
wherein between the surface of the anode member and the surface of the cathode member in the capacitor element and between an inner face of the case and an outer face of the capacitor element, a solid-at-normal-temperature substance is disposed that has an electrolyte dissolved in a solvent that is solid at or below a first temperature and that melts when heated to or above a second temperature higher than the first temperature.

2. The solid electrolytic capacitor according to claim 1, wherein the first temperature is 30° C.

3. The solid electrolytic capacitor according to claim 2, wherein the solvent contains at least one of polyethylene glycol, a polyhydric alcohol, an aliphatic acid ester of glycerol, and a sugar.

4. The solid electrolytic capacitor according to claim 2, wherein the second temperature of the solvent is 50° C.

5. The solid electrolytic capacitor according to claim 4, wherein the solvent contains at least one of PEG2000, PEG4000, PEG6000, PEG10000, PEG20000, 1,2-dodecane diol, 1,12-dodecane diol, polyglyceryl-6 stearate, polyglyceryl-6 tristearate, polyglyceryl-4 pentastearate, polyglyceryl-10 decastearate, polyglyceryl-10 hepta (behenate/stearate), xylitol, and sorbitol.

6. The solid electrolytic capacitor according to claim 2, wherein the second temperature of the solvent is 100° C.

7. The solid electrolytic capacitor according to claim 6, wherein the solvent contains at least one of erythritol, lactitol, and glucose.

8. The solid electrolytic capacitor according to claim 1, wherein the electrolyte contains either
an acid selected from the group of maronic acid, succinic acid, glutaric acid, adipic acid, sebacic acid, decanedicarboxylic acid, tartronic acid, fumaric acid, maleic acid, citraconic acid, malic acid, tartaric acid, phthalic acid, nitrophthalic acid, citric acid, tricarbanilic acid, pyromellitic acid, boric acid, phosphoric acid, borodisalicylic acid, borodiglycolic acid, trinitrophenol, hydroxynitrophenol, hydroxynitrobenzoic acid, and sulfosalicylic acid, or a base selected from the group of ammonia, monoethylamine, diethylamine, triethylamine, trimethylamine, N,N-dimethylethylamine, N,N-diethylmethylamine, monoethanolamine, diethanolamine, triethanolamine, benzylamine, naphthylamine, morpholine, aniline, acetanilide, phenanthroline, caffeine, and imidazole.

9. The solid electrolytic capacitor according to claim 1, wherein the sealing member is made of rubber or resin.

10. A method of manufacturing a solid electrolytic capacitor including:

a case housing a capacitor element along with a solid-at-normal-temperature substance having an electrolyte dissolved in a solvent that is solid at or below a first temperature and that melts when heated to or above a second temperature higher than the first temperature; and a sealing member that seals an opening in the case, the method comprising:

a capacitor element fabricating step of fabricating the capacitor element by performing:

a step of immersing in a solution containing a water-soluble first polymer and a water-dispersible second polymer a capacitor structure formed by winding up an anode member and a cathode member with a separator in between; and a step of taking the capacitor structure out of the solution and drying the capacitor structure; and an inserting step of inserting the capacitor element in the case housing the solid-at-normal-temperature substance melted by being heated to or above the second temperature so that part of the melted solid-at-normal-temperature substance permeates an interior of the capacitor element.

11. The method according to claim 10, further comprising:

a pulverizing step of pulverizing the solid-at-normal-temperature substance in solid phase into powder; and a re-melting step of putting the pulverized solid-at-normal-temperature substance in the case and then heating the solid-at-normal-temperature substance together with the case to melt the solid-at-normal-temperature substance, wherein the pulverizing step and the re-melting step are performed before the inserting step.

12. A method of manufacturing a solid electrolytic capacitor including:

a case housing a capacitor element along with a solid-at-normal-temperature substance having an electrolyte dissolved in a solvent that is solid at or below a first temperature and that melts when heated to or above a second temperature higher than the first temperature; and a sealing member that seals an opening in the case, the method comprising:

a capacitor element fabricating step of fabricating the capacitor element by performing:

a step of immersing in a solution containing a water-soluble first polymer a capacitor structure formed by winding up an anode member and a cathode member with a separator in between;

a step of taking the capacitor structure out of the solution and drying the capacitor structure;

a step of immersing the dried capacitor structure in a solution containing a water-dispersible second polymer; and a step of taking the capacitor structure out of the solution and drying the capacitor structure; and an inserting step of inserting the capacitor element in the case housing the solid-at-normal-temperature substance melted by being heated to or above the second temperature so that part of the melted solid-at-normal-temperature substance permeates an interior of the capacitor element.

13. A method of manufacturing a solid electrolytic capacitor, comprising:

a case housing a capacitor element along with a solid-at-normal-temperature substance having an electrolyte dissolved in a solvent that is solid at or below a first temperature and that melts when heated to or above a second temperature higher than the first temperature; and a sealing member that seals an opening in the case, the method comprising:

a capacitor element fabricating step of fabricating the capacitor element by performing:

a step of immersing in a solution containing a water-dispersible second polymer a capacitor structure formed by winding up an anode member and a cathode member with a separator in between;

a step of taking the capacitor structure out of the solution and drying the capacitor structure;

a step of immersing the dried capacitor structure in a solution containing a water-soluble first polymer; and a step of taking the capacitor structure out of the solution and drying the capacitor structure; and an inserting step of inserting the capacitor element in the case housing the solid-at-normal-temperature substance melted by being heated to or above the second temperature so that part of the melted solid-at-normal-temperature substance permeates an interior of the capacitor element.

* * * * *